United States Patent [19]

Kamuf et al.

[11] Patent Number: 4,956,246

[45] Date of Patent: Sep. 11, 1990

[54] ELECTROCHEMICAL STORAGE CELL

[75] Inventors: Alfred Kamuf, Walldorf; Wolfgang Dörrscheidt, Helmstadt, both of Fed. Rep. of Germany

[73] Assignee: Asea Brown Boveri Aktiengesellschaft, Mannheim, Fed. Rep. of Germany

[21] Appl. No.: 455,305

[22] Filed: Dec. 22, 1989

[30] Foreign Application Priority Data

Dec. 24, 1988 [DE] Fed. Rep. of Germany ....... 3843906

[51] Int. Cl.$^5$ .......................................... H01M 10/39
[52] U.S. Cl. .................................................. 429/104
[58] Field of Search ..................... 429/104, 101, 102

[56] References Cited

U.S. PATENT DOCUMENTS

| 4,167,807 | 9/1979 | Verity | 29/623.1 |
|---|---|---|---|
| 4,189,530 | 2/1980 | Mitoff | 429/104 |
| 4,204,035 | 5/1980 | King | 429/104 |
| 4,476,201 | 10/1984 | Repenning et al. | 429/104 X |
| 4,656,102 | 4/1987 | Hasenawer et al. | 429/104 |

Primary Examiner—Anthony Skapars
Attorney, Agent, or Firm—Herbert L. Lerner; Laurence A. Greenberg

[57] ABSTRACT

An electrochemical storage cell includes a pot-shaped solid electrolyte, inside of which an anode space is disposed. The storage cell is bounded by a metallic housing. A cathode space is disposed between the solid electrolyte and the housing. The pressure in the cathode space is held at a higher level than in the anode space in order to prevent destruction of the storage cell in the event of a rupture of the solid electrolyte.

5 Claims, 1 Drawing Sheet

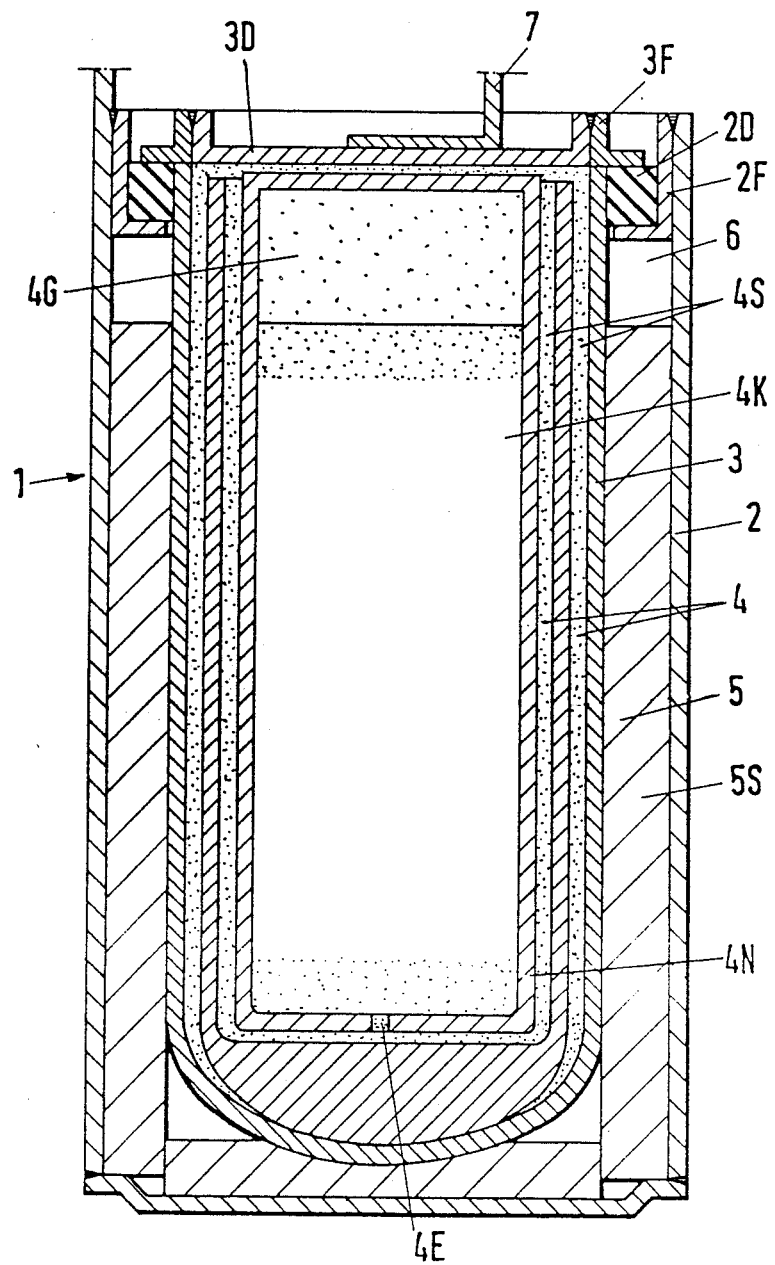

ELECTROCHEMICAL STORAGE CELL

The invention relates to an electrochemical storage cell based on sodium and sulphur, having an anode space and a cathode space being separated from one another by an alkali metal ion-conducting solid electrolyte and being bounded at least regionally by a metallic housing, a cartridge filled with sodium being disposed in the anode space, and a gap filled with sodium being provided between the cartridge and the solid electrolyte.

Such electrochemical storage cells are highly suitable as energy sources. They are increasingly being used in the construction of high-temperature storage batteries which are provided for supplying current to electric vehicles.

A specific example of these storage cells are those based on sodium and sulphur, which are rechargeable and have a solid electrolyte of beta aluminum oxide that separates the anode space from the cathode space. A particular advantage of such storage cells is the fact that no electrochemical secondary reactions occur during the charging of the cells, and the current efficiency is therefore approximately 100%. In such storage cells, the delimiting housing has a pot-shaped construction. The same applies to the solid electrolyte, in the interior of which the anode space is disposed. The cathode space is situated between the solid electrolyte and the housing. The disadvantage of electrochemical storage cells with that type of construction is that the solid electrolytes may be destroyed when high voltages are applied to the storage cells. Excessive age or mechanical damage to the solid electrolytes can likewise lead to the rupture of the latter. The consequence of such an occurrence is that sodium from the anode space and sulphur from the cathode space can flow together and react directly with one another. That results in a pronounced increase in the temperature within the storage cell. In unfavorable cases, destruction of the metallic housing and of adjoining storage cells occurs.

German Published, Non-Prosecuted Application No. DE-OS 31 17 619.4 discloses an electrochemical storage cell based on sodium and sulphur with a pot-shaped construction. In order to prevent a direct flowing together of sodium and sulphur in the case of a rupture of the solid electrolyte, a safety space is provided in that device. The space is divided into two regions. The first region is disposed in the anode space and the second region is disposed in the cathode space. However, it is not always possible to completely prevent the direct flowing together of sodium and sulphur in such a device, with the result that a pronounced increase in the temperature of the storage cell and, in unfavorable cases, a destruction and impairment of adjacent cells, can nevertheless occur.

It is accordingly an object of the invention to provide an elctrochemical storage cell, which overcomes the hereinaforementioned disadvantages of the heretofore-known devices of this general type and to do so in such a way that its internal temperature can never rise so far that destruction of the cell housing occurs.

With the foregoing and other objects in view there is provided, in accordance with the invention, an electrochemical storage cell based on sodium and sulphur, comprising an anode space, a cathode space, an alkali metal ion-conducting solid electrolyte separating the spaces from one another, a metallic housing bounding the spaces at least over a certain area, a sodium-filled cartridge being disposed in the anode space and defining a sodium-filled gap between the cartridge and the solid electrolyte, and means for maintaining a higher pressure level in the cathode space than in the anode space.

In accordance with another feature of the invention, the higher pressure level maintaining means maintains a higher pressure in the cathode space than in the gap.

By virtue of the fact that a higher pressure is maintained in the cathode space than in the anode space or in the entire interior of the solid electrolyte according to the invention, no sodium can flow into the cathode space in the event of a rupture of the solid electrolyte. On the contrary, in the case of a rupture of the solid electrolyte, sulphur or sodium polysulphide, depending on the state of the storage cell, is pressed into the region of the rupture and thus into the gap between the safety insert and the solid electrolyte. Since the construction of the storage cell fundamentally leaves only enough sodium in the safety gap for the inner surface of the solid electrolyte to be just sufficiently wetted thereby, reactions between sodium and sulphur are completely impossible or only possible to a limited extent. The reaction products which form additionally block the crack, and the continued flow of sodium is thereby likewise prevented.

In accordance with a further feature of the invention, there is provided a sulphur electrode disposed in the cathode space, the higher pressure level maintaining means being in the form of an additional gas cushion disposed in the cathode space for maintaining the higher pressure in the cathode space.

In accordance with an added feature of the invention, there is provided a sulphur electrode disposed in the cathode space, the higher pressure level maintaining means being in the form of a chemical compound in the cathode space decomposing at the operating temperature of the storage cell, namely substantially between 300° and 350° C. with an inert gas being released, for maintaining the higher pressure in the cathode space.

The chemical compound need merely fulfil the condition of not entering into any reactions with the sulphur of the cathode space or the sodium polysulphide.

In accordance with a concomitant feature of the invention, the chemical compound in the cathode space is sodium azide ($NaN_3$).

Other features which are considered as characteristic for the invention are set forth in the appended claims.

Although the invention is illustrated and described herein as embodied in an electrochemical storage cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a fragmentary, diagrammatic, vertical-sectional view of the electrochemical storage cell of the invention.

Referring now to the single FIGURE of the drawing in detail, there is seen an electrochemical storage cell 1. The cell is essentially formed of a housing 2 and a solid electrolyte 3. Both are of pot-shaped design. The interior of the solid electrolyte 3 serves as anode space or chamber 4. The solid electrolyte 3 is manufactured from beta aluminum oxide. The dimensions of the solid electrolyte 3 are chosen in such a way that a continuous interspace, which serves as cathode space 5, remains between it and the housing 2. A cartridge 4K, which is filled with sodium 4N, is disposed within the anode space 4. The dimensions of the cartridge 4K are chosen in such a way that a narrow gap 4S, which is filled with sodium during the operation of the storage cell 1, remains between the outer surface of the cartridge 4K and the inner surface of the solid electrolyte 3. In order to fill the gap 4S with sodium, the lower end of the cartridge 4K is provided with an outlet opening 4E, through which sodium can flow into the gap 4S. The flow of sodium is just large enough for the solid electrolyte 3 to be wetted with sodium over the entire inner surface thereof. The cathode space 5 essentially contains a sulphur electrode 5S, which is formed by a graphite felt impregnated with sulphur.

In the exemplary embodiment illustrated in the drawing, a gas cushion 6 is disposed within the cathode space above the sulphur electrode 5S, in the sealing region of the storage cell. The gas cushion 6 is formed by an inert gas, for example nitrogen, which exerts a defined pressure on the sulphur electrode 5S. The magnitude of the pressure in the cathode space 5 is chosen in such a way as to ensure that it is impossible for any sodium to flow out of the gap 4S into the cathode space in the event of a rupture of the solid electrolyte 3. It is also possible to introduce a chemical compound 6 into the cathode space 5, instead of the gas cushion 6. A chemical compound which decomposes at the operating temperature of the storage cell, preferably at between 300° and 350° C. is preferably used for this purpose, with an inert gas, for example nitrogen, being released. The chemical compound being used must additionally fulfil the condition that it does not form harmful reaction products either with the sulphur or with the sodium polysulphide. The quantity of the chemical compound to be introduced into the cathode space depends on the necessary gas quantity which is required to likewise prevent the flowing of the sodium into the cathode space in the case of a rupture of the solid electrolyte. A suitable chemical compound for this purpose is sodium azide, which decomposes at 300° to 350° C., with nitrogen being released. In the case of a firm seal of the storage cell 1 with respect to the outside, the gas cushion 6 or the gas formed during the decomposition of the chemical compound is effective for the entire life of the storage cell. The cathode space 4 is sealed through an inward-pointing flange 2F at the upper end of the housing 2 and an outward-pointing flange 3F of the solid electrolyte 3, which is manufactured from alpha aluminum oxide. The outward-pointing part of the flange 3F is mounted and supported on the inward-pointing flange 2F through a sealing ring 2D. The interior of the solid electrolyte 3 is sealed by a cover 3D. An anodic current collector 7 which is secured to the outer surface of the cover 3D, is electrically conductively connected to the interior of the anode space 4. A cathodic current collector is formed by the metallic housing 2.

We claim:

1. Electrochemical storage cell based on sodium and sulphur, comprising an anode space, a cathode space, an alkali metal ion-conducting solid electrolyte separating said spaces from one another, a metallic housing at least regionally bounding said spaces, a sodium-filled cartridge being disposed in said anode space and defining a sodium-filled gap between said cartridge and said solid electrolyte, and means for maintaining a higher pressure level in said cathode space than in said anode space.

2. Electrochemical storage cell according to claim 1, wherein said higher pressure level maintaining means maintains a higher pressure in said cathode space than in said gap.

3. Electrochemical storage cell according to claim 1, including a sulphur electrode disposed in said cathode space, said higher pressure level maintaining means being in the form of a gas cushion disposed in said cathode space for maintaining the higher pressure in said cathode space.

4. Electrochemical storage cell according to claim 1, including a sulphur electrode disposed in said cathode space, said higher pressure level maintaining means being in the form of a chemical compound in said cathode space decomposing at substantially between 300° and 350° C. for maintaining the higher pressure in said cathode space.

5. Electrochemical storage cell according to claim 4, wherein said chemical compound in said cathode space is sodium azide.

* * * * *